April 7, 1970      R. B. MASON      3,505,440
METHOD AND APPARATUS FOR BLOW MOLDING
Filed Oct. 3, 1966
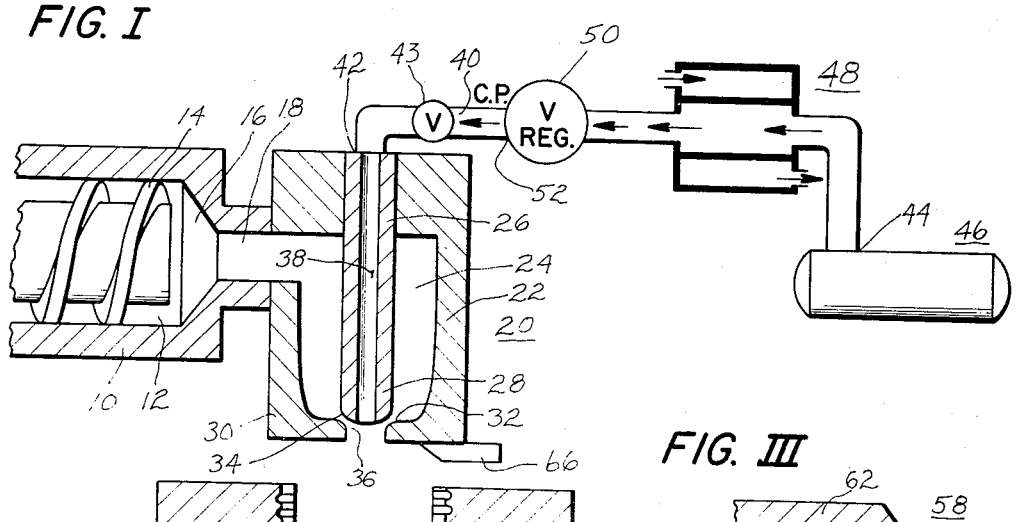
FIG. I
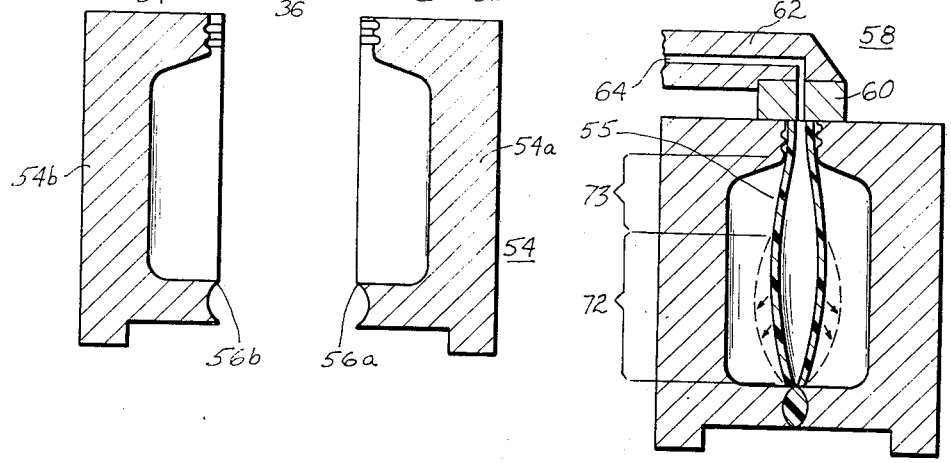
FIG. II
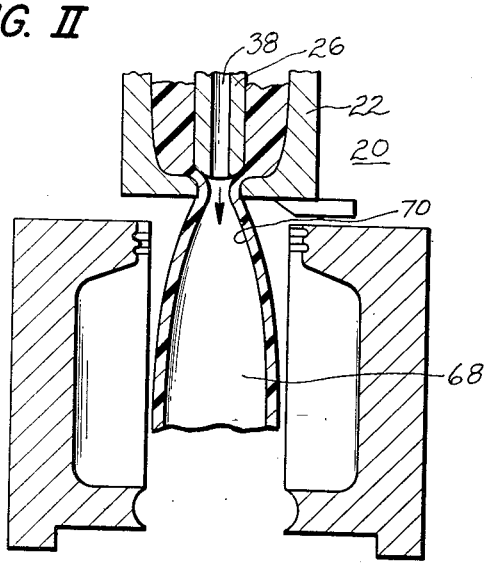
FIG. III
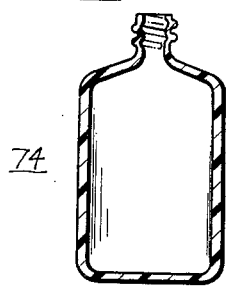
FIG. IV
INVENTOR.
ROBERT B. MASON
BY
James A. Lagomasini
ATTORNEY:

United States Patent Office 3,505,440
Patented Apr. 7, 1970

3,505,440
METHOD AND APPARATUS FOR BLOW MOLDING
Robert B. Mason, Mystic, Conn., assignor to Monsanto Company, St. Louis, Mo., a corporation of Delaware
Filed Oct. 3, 1966, Ser. No. 583,525
Int. Cl. B29c 17/07
U.S. Cl. 264—89          8 Claims

ABSTRACT OF THE DISCLOSURE

In a blow molding process, a method and apparatus for introducing conditioned gas into an extruding thermoplastic parison to cool a portion of its inner surface in order to inhibit subsequent stretching and thinning thereof, thereby promoting uniformity of thickness of the thermoplastic in the article subsequently formed in a blow mold.

---

This invention is directed to an improved method and apparatus for blow molding plastic articles.

When hot thermoplastic material is forced downwardly through an extrusion outlet to form a parison from which an article, e.g., a bottle, is to be blow molded, the weight of the initially extruded portion of the parison tends to stretch and thin the wall of that subsequently extruded, due to the influence of gravity. Blowing an article formed from a parison having such a thinned upper wall portion results in uneven wall thickness distribution in the article, since a portion of the bottom wall is thicker than the top. This results in poor vertical load strength, causing collapse and buckling when a plurality of such articles are vertically stacked. The problem is especially acute when forming large diameter articles because of the thinness due to the greater amount of expansion.

In recognition of this problem, it has been proposed in the past to extrude successive lengths of the parison with different wall thicknesses by means of an axially moveable mandrel reciprocating in the extrusion outlet orifice to vary the orifice opening and thereby regulate the thickness of the parison wall as it is formed. This method entails use of complicated and expensive programming and mandrel actuating equipment.

Accordingly it is the principal object of the present invention to provide a method and apparatus for forming hollow articles having improved uniformity of wall thickness distribution.

It is an additional object of the present invention to provide a method and apparatus for producing a parison having a cooled inner surface from which an article will be blown.

It is a particular object of the present invention to provide a method and apparatus for forming large diameter, hollow articles having improved top load strength.

It is a further object of the present invention to provide a method and apparatus for blow molding hollow articles having improved uniformity of thickness distribution without mechanical movement of extrusion tooling.

A further object of the present invention is to provide a method for selectively varying the wall thickness of blow molded articles by use of conventional apparatus without use of additional mechanical extrusion means.

It is a further object of the present invention to provide a method for producing high quality articles at reduced cost.

Other objects of this invention will in part be obvious and will in part appear hereafter.

These and other objects are accomplished by providing a method and apparatus for introducing conditioned gas into at least a portion of a parison to be used in blow molding a container, to effect changes in its surface temperature.

In describing the overall invention, reference will be made to the preferred embodiment illustrated in the accompanying drawings in which:

FIG. 1 is a partial, vertical, schematic sectional view of the apparatus of the present invention.

FIG. 2 is a partial, vertical, sectional view at an early stage in the present process with conditioned gas flowing through the parison.

FIG. 3 is a partial, vertical, sectional view of the chilled parison within the mold, schematically illustrating the primary blow section of the parison.

FIG. 4 is an elevational view of a typical article formed according to the present invention.

With reference to the drawings wherein identical numerals refer to identical parts, there is shown in FIG. 1 a conventional extruder barrel 10 having an internal chamber 12 in which an extruder worm, schematically illustrated as 14 rotates to fuse and advance plastic through barrel 10 and outlet 16. Adjacent outlet 18 is connected to outlet 16 and communicates with the parison forming unit or extrusion head 20. Extruder barrel 10 would be surrounded with conventional heating units not illustrated, to aid in fusing and plasticizing material supplied from a conventional hopper, opening into the inlet end of the extruder barrel, not shown, which hopper serves as the source of plastic material.

Vertical extrusion head 20 comprises generally cylindrical exterior chamber wall 22 and cylindrical reservoir 24 communicating with adjacent outlet 18 at the discharge end of the extruder. Cylindrical mandrel 26 of extrusion head 20 is mounted within reservoir 24 so as to define an annular cavity. Extrusion tip 28 is mounted at the lower end of mandrel 26, which provides an inner surface of a parison defining outlet through which a heated and suitably homogenized thermoplastic resin such as, for example, polyethylene is extruded in generally tubular form. Extrusion ring 30 is mounted at the lower end of extrusion head 20 and has curved shoulder 32 which cooperates with the adjacent, generally convex downward surface 34 of extrusion tip 28, so as to define an annular outlet orifice 36 in axial alignment with tip 28.

Mandrel 26 is bored to provide passageway 38 therein. Gas pressure supply line or tube 40 has one end at 42 connected with passageway 28 and communicates on the other end at 44 with a suitable low pressure gas supply source 46. This communication may be continually maintained and gas pressure supplied intermittently to passageway 38 as by means of control valve 43 mounted in line 40 between passageway 38 and gas supply source 46.

As an important part of the present invention, means are provided for conditioning the gas prior to entry into passageway 38. This comprises heat exchanger 48 for regulating the temperature of the gas and regulating valve 50 which maintains the pressure of the gas constant at its outlet or discharge side 52. It is important that exchanger 48 be situated adjacent the extrusion head 20 between control valve 43 and source 46, in order to minimize dead spots in the line wherein the temperature of the gas therein might rise between cycles.

Multi section mold 54 is provided, having mold sections 54a and 54b which form a cavity, generally designated as 55 in which to blow mold and shape the article. Extrusion head 20 is so disposed that mold 54 may be brought into registry therewith. Mold sections 54a and 54b have cooperating projections 56a and 56b at the bottom thereof for pinching the end of the tubular parison therebetween when the mold halves are closed.

Blow assembly 58 is shown in FIG. 3, which comprises blow head 60 and blow head arm support 62. Channel 64 is provided in blow assembly 58 and is connected conventionally to pressurized gas supply source, not shown.

Conventional cutter blade 66 is a provided between extrusion head 20 and mold 54, and adapted by conventional means not shown to move transversely across the lower face of generally cylindrical exterior chamber wall 22 to sever the parison formed in outlet orifice 36.

In operation, hot thermoplastic material issuing from reservoir 24 of extrusion head 20 is extruded downwardly through annular outlet orifice 36 to form a generally tubular length of the material typically shown in FIG. 2 as 69. Mold halves 54a and 54b at this point are in open position and in registry with extrusion head 20. When about approximately ⅔ of the length of a parison necessary to form an article has been extruded, valve 43 is opened to permit introduction of low pressure gas through passageway 38 in mandrel 26 into the open ended parison 68 being formed, to cool and chill the inside surface 70 of that portion of the parison formed while the gas is flowing. This cooled portion is generally adjacent to outlet 36 of extrusion head 20. As shown, this is the section of the parison which generally will form the upper portion of the article body. Control valve 43 is maintained open thereafter and gas allowed to enter until the parison from which one bottle will be blown is completely formed, when it is then closed either manually or automatically. When a length of parison sufficient to permit one bottle to be blown therefrom has been extruded, mold halves 54a and 54b are closed by conventional means not shown, and cut off or shearing blade 66 is caused to move transversely across the lower end of the cavity to sever the connection between the mold 54 and outlet orifice 36. The mold is closed about the parison while pinching in the lower joint thereof the exteriorly projecting portion of the parison. The pinched parison is thereafter expanded into surface contact with the mold cavity walls as illustrated in FIG. 3 by introducing pressurized gas into cavity 55 through channel 64 in blow assembly 58. This type of operation is well known in the art and is subject to many variations in the type of blowing technique used.

The pressurized gas flowing into the extruding parison from source 46 through passageway 38 in mandrel 26 is cooled on passing through heat exchanger 48 and maintained at constant pressure by pressure regulating valve 50 in line 40.

The section of the parison contacted by the chilled gas resists stretching due to gravity, blows up last, and thereby retains some of the material which normally is blown into other sections if such cooling were not employed.

FIG. 3 depicts the parison with the cooled inner surface enclosed in the mold just prior to blowing. The section denoted 72 is the primary blow section, that is, the portion of the parison which is not appreciably cooled by the chilling gas and which will therefore expand first under the influence of the blowing gas, as schematically illustrated in dotted outline in FIG. 3. The section of the parison denoted as 73 in FIG. 3 represents the cooled portion which will expand after that denoted as 72.

A bottle 74 is illustrated in section in FIG. 4, which has been formed according to the method and apparatus of the present invention, depicting equal wall thickness from the top to the bottom of the article.

The above description and particularly the drawings are set forth for purposes of illustration only and are in no way to be taken in a limited sense.

This invention is directed toward a method and apparatus for forming a hollow article comprising the steps of:

(a) Extruding thermoplastic material from a supply source through an annular outlet orifice to form a generally tubular open ended parison;

(b) Introducing conditioned gas into the parison to cool at least a portion of its inner surface;

(c) Enclosing the parison having the cooled inner surface portion within a partible mold; and (d) Expanding the parison enclosed within the mold to form the hollow article;

The degree to which the parison resists stretching during expansion in the blow molding step is dependent on the temperature of the conditioned gas previously introduced into the parison to cool its inner surface. This temperature as measured at the point of entry into the parison is ordinarily confined to the range between about minus 20° F. to about 10 degrees below the crystalline melting point of the thermoplastic involved. In general, for most thermoplastics, temperautres within the range of about minus 20° F. to about 150° F. are satisfactory, and in the case of high density polyethylene, it is important that it be maintained within the range from about 30° F. to about 90° F. These temperatures may be achieved either with or without the use of an air cooler, depending on the temperature of the gas in the supply source. Cooling generally occurs at or adjacent to the inner surface of the parison. Because of the low heat conductivity of plastics in general, no cooling of the outer surface generally occurs. When extreme chilling is desired by use of gas at temperatures close to the lower end of the temperature ranges set out above, it may be desirable to insulate the inside surface of the bore in the mandrel or other conduit being used to channel the gas to the parison interior. In the preferred embodiment, the extrusion head temperature is generally about 400° F., and such insulation, therefore, would be particularly desirable to minimize gas temperature increase.

For ratios of nozzle openings to parison inside diameter of 0.09 to 2, the pressure of the gas at the point of entry into the parison must be within the range of about 0.5 to about 5 p.s.i. greater than atmospheric pressure and preferably within the range of about 1 to 2 p.s.i. greater than atmospheric pressure. Specially designed nozzle openings will enable use of pressures within the range of ½ to 50 p.s.i. greater than atmospheric pressure. With the low pressures usually involved it may be seen that the amount of gas utilized in the present invention is very small.

Additional equipment may be installed in the chilled low pressure gas supply line for further conditioning the gas if desired. For example, a filter and/or drier may be utilized.

It should be noted that the method and apparatus of the present invention is not limited in scope for use only in offsetting the influence of gravity on a downwardly extruding parison, but rather can be used to make any section of the wall thickness in a horizontal plane of the finished article either thicker or thinner than would ordinarily be obtained. Based on the fact that the hottest or thinnest portion of the parison blows first, if, for example, it is desired to make the bottom portion of the article sidewall thicker than the top rather than the reverse, the gas would be turned on at or close to the very start of the extrusion of the parison and turned off when that portion of the parison has been extruded which will form the section of the finished article sidewall which it is desired to maintain thick. It is also within the scope of the present invention to provide for a plurality of gas injections into a single parison section to be used to form an article, in order to vary the wall thickness distribution of material in multiple sections of the parison, for example, at the top and the bottom sections of the parison corresponding to the upper and lower portions of the finished article. It is preferable, however, that the gas not be left on continuously, since excessive flash occurs in the neck area of the mold on closing the mold sections about the parison when this is done.

Any plastic material capable of being blown may be utilized in the present invention. Typical materials are thermoplastics such as polyethylene, polypropylene, polymers of vinyl chloride and polystyrene. Preferred materials are high density polyethylene and polymers of vinyl chloride.

The technique of the present invention is broadly applicable to the formation of a generally cylindrical parison by pressurizing thermoplastic material through an annular orifice. The parison may be formed by extruding vertically upwardly or downwardly, horizontally or at any angle. Obviously extruding other than in a vertically downwardly direction will require that the open end of the parison be separately supported or gripped, as by means of a separate article neck mold. It is essential, however, that access be provided to the outlet orifice to enable the conditioned low pressure gas to enter the interior of the parison as it is formed in the orifice, or shortly thereafter.

Though not essential, a disperser may be mounted in the end of the passageway through which the chilled gas flows en route to contact with the inner surface of the parison to achieve better cooling. A disperser is especially applicable when extruding large diameter parisons where buildup of the plastic on the disperser would be less likely to occur because of the greater space which could be maintained between the disperser and the parison inner wall. Such a disperser might be a generally cylindrical perforated tube having a diameter slightly less than that of the mandrel tip.

The method and apparatus of the present invention is applicable in forming any blow molded article, and is especially applicable in forming bottles having large diameter cylindrical body portions.

As will be clear to one skilled in the art, conventional automatic means may be provided to perform the various steps of the inventive process in a proper sequence.

Various other modifications and alterations will be readily suggested to persons skilled in the art. It is intended, therefore, that the foregoing be considered as exemplary only.

What is claimed is:
1. A method of forming a hollow article comprising the steps of:
   (a) extruding thermoplastic material from a supply source through an annular outlet orifice to form a generally tubular open ended parison;
   (b) introducing conditioned gas at a pressure of between about 0.5 to about 5 p.s.i. greater than atmospheric pressure into a selective section of the parison to cool at least a portion of its inner surface;
   (c) enclosing the parison having the cooled inner surface portion within a partible mold; and
   (d) expanding the parison enclosed within the mold to form the hollow article.

2. A method as set forth in claim 1 wherein the gas temperature is within the range of between about minus 20° F. and about 150° F.

3. A method as set forth in claim 1 wherein the thermoplastic is high density polyethylene.

4. An apparatus for forming a hollow article of plastic material comprising:
   (a) a source of plastic material;
   (b) an extrusion head having an annular outlet orifice;
   (c) means for causing the plastic material to flow through the orifice to form an open ended tubular parison of the plastic material;
   (d) a source of low pressure gas for the interior of the tubular parison;
   (e) a tube communicating with the low pressure gas source and the orifice;
   (f) means for conditioning the gas prior to entry into the interior of the tubular formation;
   (g) a blow mold for forming said article from said parison; and
   (h) gas flow control means operable in timed relation to said flow of plastic through said orifice to introduce said low pressure gas into said parison after a portion of said parison has been formed and prior to enclosure of said parison within said blow mold.

5. The apparatus as set forth in claim 4, wherein the gas conditioning means includes a pressure controller and a temperature controller.

6. The apparatus as set forth in claim 4, wherein the annular outlet orifice in the extrusion head is formed by an extrusion ring and an adjacent mandrel in axial alignment therewith, the mandrel having a bore connected to the conduit.

7. The apparatus as set forth in claim 4, including the following element:
   (a) gas dispensing means on the end of the mandrel adjacent the extrusion ring for distributing gas around the inside of the parison formed in the outlet orifice.

8. An apparatus for forming a hollow article of thermoplastic material comprising:
   (a) a source of thermoplastic material;
   (b) an extrusion head having a ring member with an opening therein and a mandrel having a central bore adjacent to and in axial alignment with the ring member to define an annular outlet orifice;
   (c) means for forcing the thermoplastic material through the orifice to form a hollow, open ended tubular parison of the thermoplastic material;
   (d) a blow mold for enclosing said parison and forming the article from said parison;
   (e) a reservoir of low pressure gas for the interior of the tubular formation;
   (f) a conduit connected at opposite ends to the bore and the reservoir;
   (g) a gas flow controller between the bore and the reservoir operable in timed relation to said forcing of thermoplastic through said orifice to introduce said low pressure gas into said parison after a portion of said parison has been formed and prior to enclosure of said parison within said blow mold;
   (h) a pressure controller and a temperature controller both communicating with the low pressure gas between the bore and the reservoir; and
   (i) means for supplying high pressure gas to said blow mold for expanding said tubular parison when enclosed in said blow mold into the shape of said article.

References Cited
UNITED STATES PATENTS

| | | |
|---|---|---|
| 2,336,821 | 12/1943 | Wadman. |
| 3,065,501 | 11/1962 | Gasmire _____ 264—98 X |
| 3,125,619 | 3/1964 | Miller. |
| 3,127,458 | 3/1964 | Scott et al. _____ 264—98 |
| 3,311,684 | 3/1967 | Heider _____ 264—98 X |
| 3,363,034 | 1/1968 | Noland et al. _____ 264—98 X |

ROBERT F. WHITE, Primary Examiner

T. J. CARVIS, Assistant Examiner

U.S. Cl. X.R.

18—5; 264—98